INVENTOR.
JURIAN W. VAN RIPER
BY Alfred W. Vibber
ATTORNEY

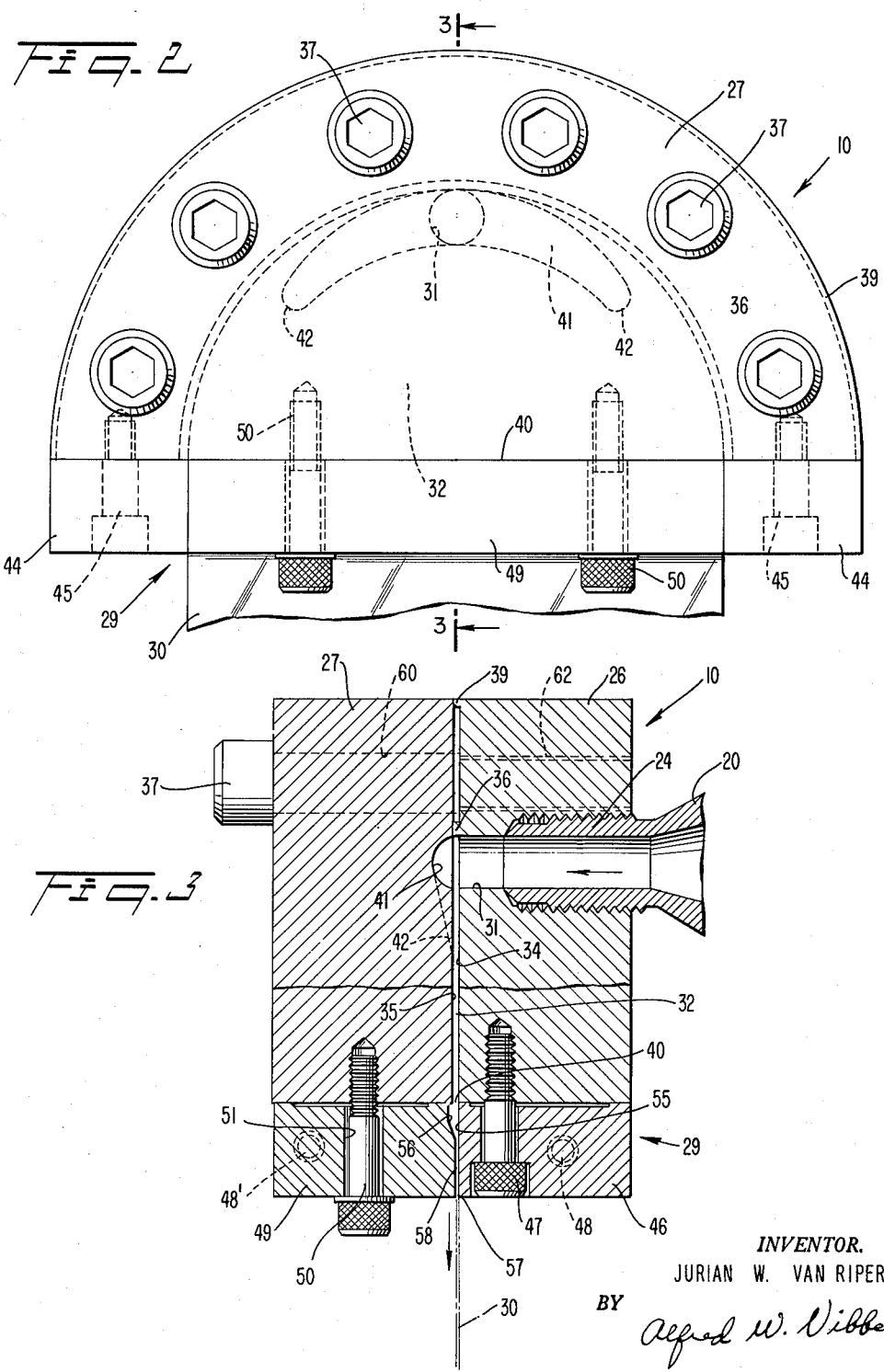

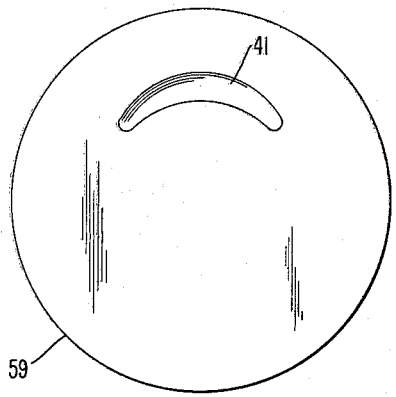
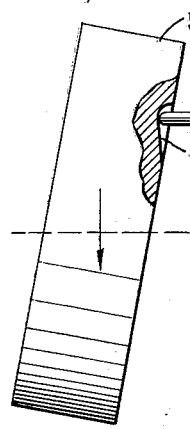
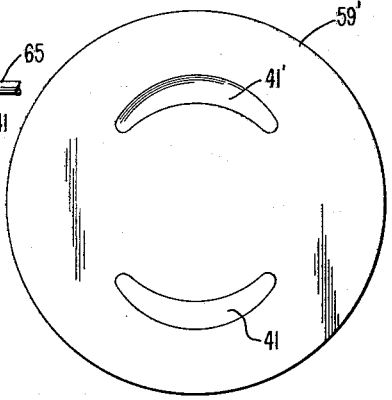
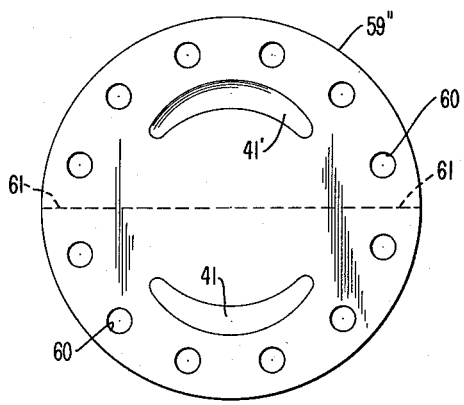
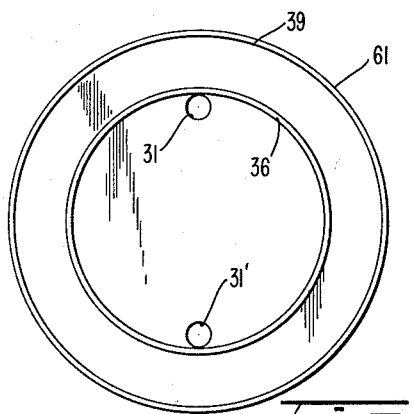
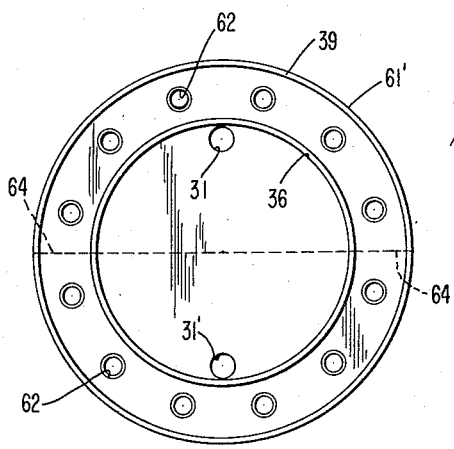
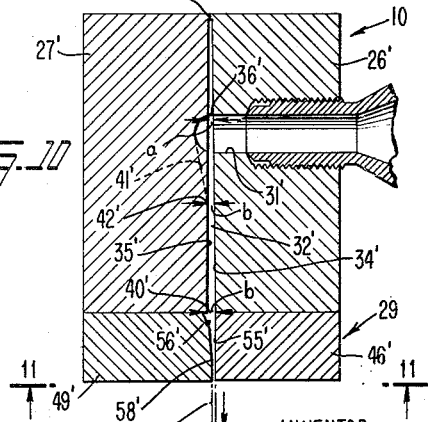

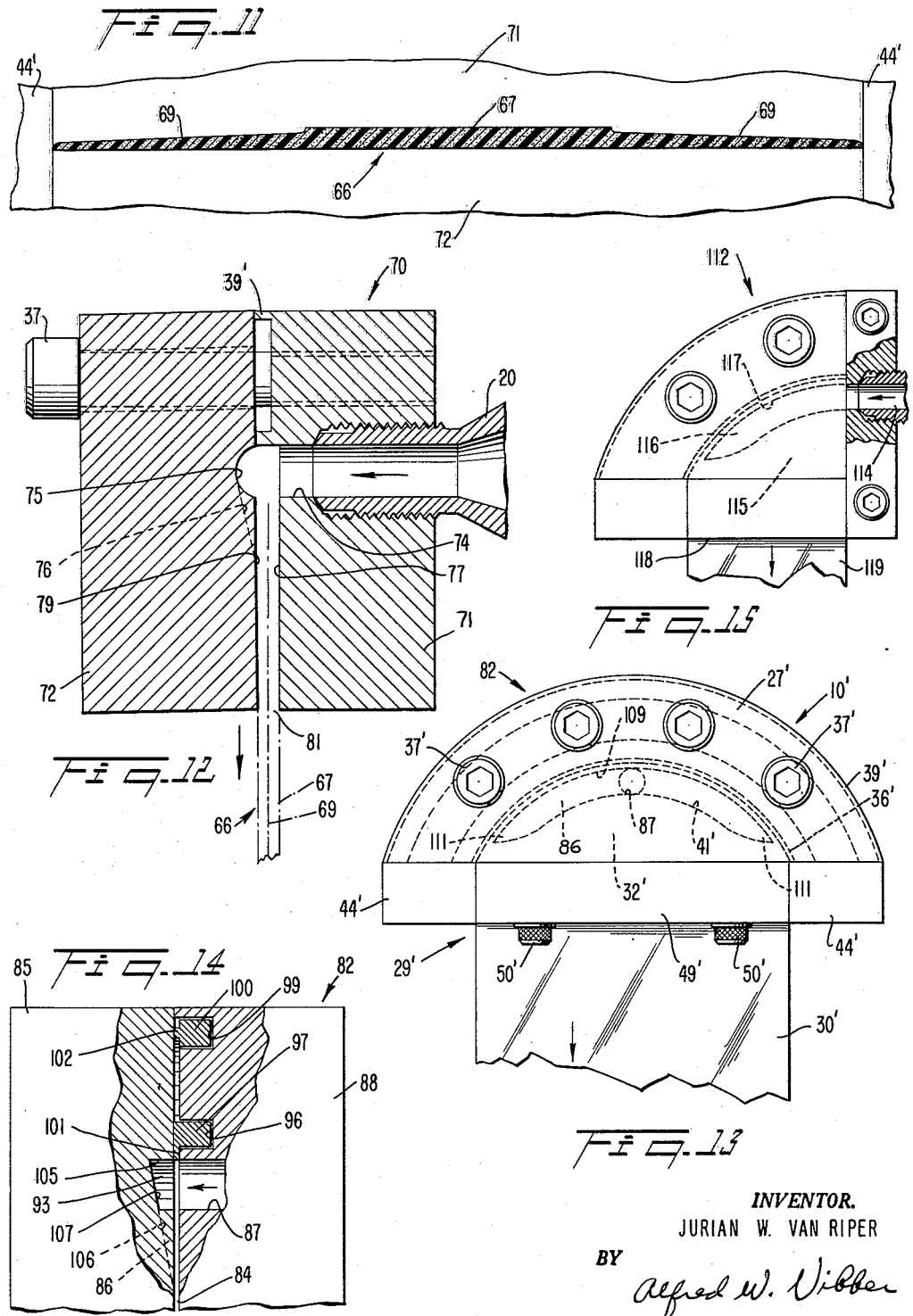

3,085,289
PLASTIC MATERIAL EXTRUSION HEAD
Jurian W. Van Riper, 208 Beechwood Road,
Ridgewood, N.J.
Filed Apr. 3, 1961, Ser. No. 100,175
10 Claims. (Cl. 18—12)

This invention relates to an improved apparatus for forming plastic material of laterally extended cross-section by extrusion through an opening functioning as a die.

The invention has among its objects the provision of an improved plastic material extrusion head for apparatus of the indicated character, such head being of simplified construction.

A further object of the invention lies in the provision of an improved plastic material extrusion head which incorporates novel means for distributing plastic material under pressure to an elongated opening functioning as a die whereby the extended product may be made of the desired thickness.

Another object of the invention, in one disclosed embodiment thereof, lies in the provision of an improved plastic material sheeting head which incorporates novel means for distributing plastic material under pressure to an elongated opening functioning as a sheeting die whereby the sheet produced may be made of uniform thickness throughout its lateral extent.

A still further object of the invention lies in the provision of an improved extrusion head which is easily made by simple machining operations, said head having a plenum chamber, the contour of which may be easily altered when such alteration is required.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in horizontal section through a plastic material extruding apparatus provided with a sheeting head in accordance with a first disclosed embodiment of the invention, the section being taken along the axis of the plastic material delivering bore in the apparatus, certain of the elements being shown in plan;

FIG. 2 is a view in end elevation of the sheeting head of the apparatus of FIG. 1, the view being taken in the direction from bottom to top of FIG. 1;

FIG. 3 is a view in vertical central section through the sheeting head of FIGS. 1 and 2, the section being taken along the line 3—3 of FIG. 2, certain of the parts being shown in elevation;

FIG. 4 is a somewhat schematic view showing a blank for the formation of two similar first main parts of a sheeting head in accordance with the first disclosed embodiment of the invention, the blank being shown after it has undergone a first machining operation;

FIG. 5 is a schematic view in side elevation of the blank of FIG. 4 undergoing machining to form a delivery channel therein, a portion of the blank being shown in section;

FIG. 6 is a view similar to FIG. 4 but showing the blank of FIGS. 4 and 5 after it has undergone a further machining operation;

FIG. 7 is a view similar to FIG. 6 but showing the blank of FIGS. 4, 5, and 6 after it has been further machined and is ready to be divided along the horizontal dash line;

FIG. 8 is a somewhat schematic view of a second blank, from which two similar second parts of a sheeting head in accordance with the first disclosed embodiment of the invention are to be formed, the blank being shown in a preliminarily machined condition;

FIG. 9 is a view similar to FIG. 8 but with the blank of FIG. 8 further machined and ready to be divided along the horizontal dash line into two similar second main parts of a sheeting head in accordance with the first disclosed embodiment of the invention;

FIG. 10 is a view in vertical axial section similar to FIG. 3 of a second embodiment of sheeting head in accordance with the invention;

FIG. 11 is a fragmentary view in bottom plan of a portion of a third embodiment of plastic material extrusion apparatus in accordance with the invention, the view showing the contour of the die opening in the extrusion head of such apparatus, the extruded stock issuing from such die opening being shown in section;

FIG. 12 is a view in vertical axial section similar to FIGS. 3 and 10 of said third embodiment of plastic material extrusion head, such head forming the extruded strip material shown in FIG. 11;

FIG. 13 is a view in end elevation of a plastic material extrusion head in accordance with a fourth embodiment of the invention, the view being taken in a manner similar to that of FIG. 2;

FIG. 14 is a fragmentary view partially in vertical axial section and partially in side elevation of the embodiment of plastic material extrusion head shown in FIG. 13; and FIG. 15 is a somewhat schematic view of a fifth embodiment of plastic material extrusion apparatus in accordance with the invention.

Figure 1:
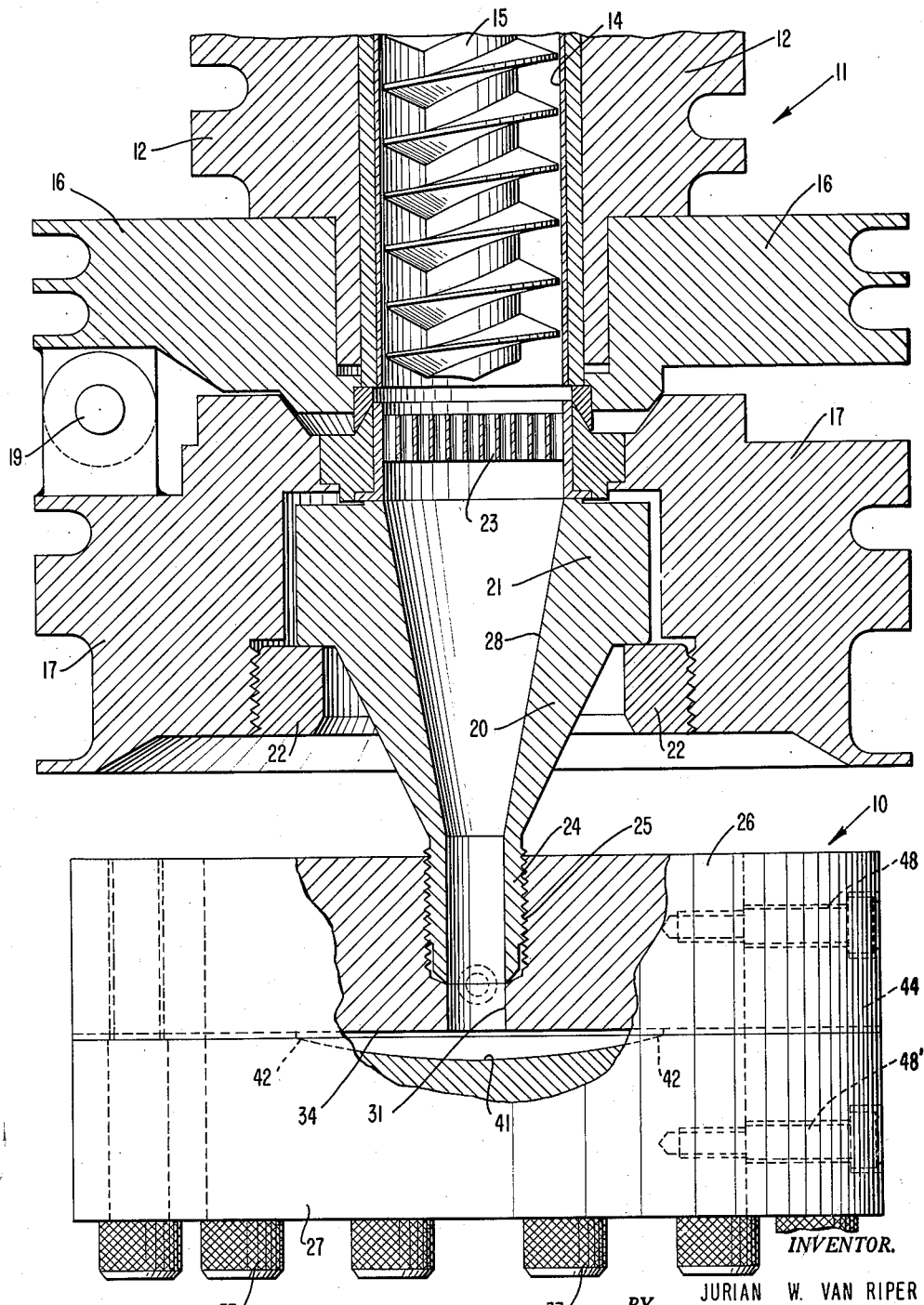

The plastic material extrusion apparatus of the invention is adapted for the continuous production of plastic material in laterally extended form. The apparatus of the invention includes an extrusion head which is designed to be connected to a source of plastic material under pressure so that the plastic material flows into the head and thence outwardly therefrom through an elongated die which forms it into the laterally extended extruded material. Apparatus of this type has long been known. Difficulties have been encountered in feeding the plastic material under pressure at the desired rates to the various zones of the die throughout its extent. Such difficulties, for example, have prevented such apparatus from competing seriously with conventionally employed apparatus for forming extended thin gauge plastic sheets, such as apparatus employing rolling and calendering devices.

The novel extrusion head of the invention overcomes the above-indicated difficulties encountered in prior extrusion heads of the indicated type. The extrusion head of the invention incorporates a plenum or distributing chamber of novel contour. Such plenum chamber may be formed to deliver plastic material under pressure at such speed and volume as are required to achieve finished products in accordance with die contour. By reason of such delivery of plastic material to the die, the die parts may be made of simplified construction, little or no physical adjustment of the die being required to produce the desired finished product.

Although the invention is not limited thereto, there are shown herein a number of extrusion heads for the production of laterally extended sheet material, such heads being commonly called "sheeting heads." The plenum or distributing chamber of extrusion heads in accordance with the invention insures the delivery of plastic material under pressure at substantially uniform speed and volume throughout the various longitudinal zones of the die orifice. In such extrusion heads the die may, in effect, be incorporated as an integral part of the extrusion head (FIGS. 12 and 15), or the die parts may be made separate from the extrusion head, as shown in connection with the other disclosed extrusion heads.

The first disclosed embodiment of extrusion head in accordance with the invention, shown in FIGS. 1–3, inclusive, is a sheeting head; such head is designated generally by the reference character 10. The second embodiment of extrusion head, shown in FIG. 8, is also a sheeting head; the head shown in FIG. 8 is designated generally by the reference character 10'. Such first two embodiments of sheeting head are substantially similar, as will appear hereinafter, except for the difference in angle between the two broad inner faces of the plenum chamber in such two embodiments.

In FIG. 1 the sheeting head 10 is shown attached to and fed by an extruding device 11 of the screw type. Machine 11, which is of conventional type, has a barrel 12 with a longitudinal bore 14 therein. A driven stock screw 15 is disposed within the bore so as to plasticize and forward under high pressure plastic material which is fed thereto as through a hopper, not shown. The barrel of the machine is suitably temperature controlled as by electrical resistance heating means and cooling means (not shown) disposed about the barrel.

The machine 11 shown is provided at the delivery end of barrel 12 with a first, hinged head. A fixed part 16 of the hinged head is fixedly attached to the delivery end of the barrel, a second part 17 of such head being connected to part 16 by a hinge 19 and by a plurality of axially extending bolts (not shown) angularly spaced about the axis of the screw 15 and holding head parts 16 and 17 together. Head part 17 is, in effect, a die holder. In the present apparatus, however, the die has been replaced by an adapter element in the form of a plastic material delivering member 20 which has an annular flanged rear portion 21 held in the die seat in head member 17 by a hollow nut member 22. The forward or outer end 24 of member 20 is of circular cylindrical shape and is externally threaded, as shown. Portion 24 is threadedly received within a central passage 25 in a first main portion 26 of the sheeting head of the first disclosed embodiment of the invention. It will be seen that plastic material forwarded by stock screw 15 passes through a strainer 23 and thence into the hollow conduit-forming interior 28 of member 20. From the interior of member 20 the plastic material flows under pressure through the central bore in portion 24 and into the sheeting head 10.

The use of the adapter member 20 in connecting the head 10 to the extruding machine is of advantage in that it allows an extrusion machine provided with a conventional die-holding head 16, 17 to be fitted with sheeting htad 10. It will be understood, however, that in some instances it may be desired to dispense with head 16, 17 and to secure the sheeting head 10 directly to the outer end of the barrel 12 while preserving the plastic material flow conditions into the head 10 substantially the same as those in the apparatus of FIGS. 1, 2, and 3. In other installations it may be desired merely to dispense with element 17 of the first described head, and to mount the sheeting head 10 so that the first main part 26 thereof is hingedly connected to element 16 as by a hinge similar to the hinge 19.

The sheeting head 10 is generally in the form of an axially thick semi-disc of which the element 26 forms generally the rear half and a second main element 27 forms the forward half. The head 10 is preferably disposed in a vertical plane, as shown, with the generally straight lower edge thereof positioned horizontally. A sheet forming die, generally designated 29, is disposed along the main central portion of the lower edge of the head so that plastic sheet 30 formed by die 29 issues downwardly from the die during the operation of the apparatus. The sheet 30 may be collected as it forms, as by being coiled, by means not shown, after it has cooled sufficiently.

The rear element 26 and the forward element 27 are so formed as to present therebetween an extended thin plenum chamber 32. Thus element 26 has a forward central flat face 34, forming the rear wall of the plenum chamber, and element 27 has a flat central rear surface 35 which, in the first described embodiment, lies parallel to surface 34. The plenum chamber 32 is fed with plastic material under pressure through a passage 31 which lies as an extension of the central passage through forward portion 24 of adapter 20.

The confronting faces 34 and 35 of elements 26 and 27 are spaced, as shown, by means of semi-circular inner and outer upstanding ribs 36 and 39, respectively, upon the forward face of element 26. The inner rib 36 surrounds the plenum chamber 32 and forms the curved side and top boundaries thereof. Element 27 is forcibly held against rib 36 in plastic material-tight relationship by a plurality of studs 37 spaced angularly about the curved portions of the elements. Each stud 37 passes through a bore 60 in element 27 and has its threaded rear end threadedly engaged with a threaded bore 62 in element 26.

The plenum chamber 32 incorporates therein a laterally symmetrical distributing channel 41 which communicates at its central point with the inlet passage 31. The distributing channel functions to spread the plastic material entering the plenum chamber from passage 31 laterally and to direct the plastic material downwardly toward the straight lower edge 40 of the plenum chamber. The distributing channel is of such configuration and cooperates with the other parts of the plenum chamber so that the plastic material is delivered at substantially uniform velocities and pressures at each of the various zones of the plenum chamber located along the lower edge 40 thereof.

The distributing channel is of such configuration that it extends across a substantial part of the width of the laterally extended shape being extruded, progressively decreases in cross-sectional area from the entrance zone thereof to the end or ends remote from the entrance zone, and lies at progressively decreasing distances from a line transversely of the shape being extruded in the direction from the entrance zone of the channel to the end or ends thereof remote from such entrance zone. In the embodiments of FIGS. 1–14, inclusive, the distributing channel is laterally symmetrical, extending on both sides of the entrance zone. In the embodiment of FIG. 15, on the the other hand, the distributing channel is laterally unsymmetrical, being fed with plastic material at a zone which is generally longitudinally aligned with one side of the shape being extruded.

In the embodiments of FIGS. 1–12, inclusive, as will be apparent hereinafter, the distributing channels are oblique sections of tores of circular cross section (toruses). In the embodiments of FIGS. 13, 14, and 15, the distributing channels are in the form of oblique sections of toroids. It is to be understood, however, that the distributing channels may be varied somewhat in shape in accordance with the invention; the embodiments shown are therefore illustrative only, the scope of the invention being defined by the claims appended hereto.

In the first embodiment shown the distributing channel 41 is disposed in forward head element 27. Channel 41 is in the form of a portion of a tore of circular cross section (a torus), the said portion of the torus being formed by a sectioning plane which is disposed at an angle somewhat less than 90° with respect to the principal axis of the torus. In the embodiment shown, the torus has the diameter of its circular cross section substantially equal to the diameter of the passage 31, and the central, deepest portion of the channel 41 has a depth substantially equal to the radius of such circular cross section. The upper edge of passage 31 and the horizontal axial projection of the upper edge of the central portion of channel 41 are disposed tangent to the inner or lower edge of rib 36 at its central zone. The projection of the longitudinal axis of the passage 31 in element 26 coincides with a horizontal diameter of the torus at the central, deepest portion of channel 41. From its deepest, central portion the channel 41 progressively decreases symmetrically in depth in both directions until it reaches the end portions 42 thereof, which are of substantially zero depth. One manner in which such preferred embodiment of channel 41 may be formed will be described hereinafter in connection with FIGS. 4, 5, and 6.

The sheeting head 10 is provided with two lower end pieces 44 which are secured to the lower edges of elements 26 and 27 by means of studs such as those shown at 45. The laterally inner edges of pieces 44 underlie and make a plastic material-tight connection with the lower ends of rib 36. The above-mentioned die 29 is positioned beneath the lower edge 40 of the plenum chamber and between end pieces 44. The die 29 includes a first fixed rear die member 46 which is fixedly attached to the lower edge of element 26 by vertical studs, of which one is shown at 47, and to end pieces 44 by horizontal studs, of which one is shown at 48.

Die 29 includes a second, slidably adjustable die member 49 which is attached to the lower edge of forward head element 27 in the manner shown in FIG. 3. Die member 49 has a plurality of generally vertically disposed clearance holes 51 extending therealong, the passages 51 loosely receiving studs 50 which are threadedly engaged in bores in the lower end of element 27. Die member 49 is secured to end pieces 44 by horizontal studs 48', of which one is shown. Studs 48' extend through clearance holes in pieces 44, and have threaded engagement with member 49. Die part 49 is thus held firmly upwardly against element 27 in adjusted position with respect thereto. Die part 49 may be adjusted toward or away from die part 46 by loosening studs 48' and 50, followed by sliding die part 49 to the desired position with respect to part 46. After this has been done, studs 48' and 50 are tightened.

The inner face 55 of die element 46 is preferably disposed in alignment with surface 34 of head part 26. The inner face of die element 49 in the embodiment shown has an upper, slanting recessed zone 56 and a lower flat zone 58 generally parallel to face 55 of die element 46. The extruded sheet 30 issues from the die orifice 57 between the outer lower portions of die surfaces 55 and 58, as shown in FIG. 3.

FIGS. 4, 5, 6, and 7 illustrate in schematic form a preferred manner in which two front elements 27 for use in an extrusion head, such as the above-discribed sheeting head 10, may be formed. As shown in FIG. 4 a blank 59 in the form of a circular metal disc of the required thickness has a distributing channel 41 formed in one zone thereof. Channel 41 may be formed, for example, by chucking blank 59 eccentrically on a lathe and then by forming the channel by a turning operation, with a tool 65 as indicated in FIG. 5. Following this, the blank is re-chucked so that it is again eccentrically mounted with respect to the spindle axis, the high point of the second eccentricity being displaced 180° with respect to the first eccentricity. The blank is again turned to form a second distributing channel 41' therein as indicated in FIG. 6, the two channels 41 and 41', being identical but spaced from each other an angle of 180° around the axis of the blank, which is now designated 59'. The blank 59' is then further machined to form the required holes 60 therein, the blank being then designated 59". Following this, the blank 59" is divided as by being sawed along the diameter 61—61 whereby to form two identical parts which, by further machining, may be made into forward elements 27 of sheeting head 10.

Essentially the same method, but with appropriate changes in the length of the distributing channel and the location of the plate-dividing cut or cuts, may be employed in making front elements of a plenum chamber which is generally in the form of less than half a circular disc. One such alternative front element is shown in FIG. 13, to be described.

FIGS. 8 and 9 schematically indicate a method which may be employed to form two rear elements 26 of sheeting head 10. A blank 61 may be turned so as to have circular inner and outer ribs 36 and 39, respectively, projecting from the forward flat face thereof. Two diametrically spaced holes 31 and 31' may then be formed in blank 61 tangent to the radially inner edge of rib 36. Following this, the blank 61, now designated 61' in FIG. 9, is provided with a plurality of stud-receiving bores 62 spaced angularly thereabout and located between ribs 36 and 39. Blank 61' may then be diametrically divided along the line 64—64 so as to provide two identical pieces which will function as elements 26 of sheeting head 10.

The forward and rear faces of the plenum chamber may, with some plastic materials, be disposed other than strictly parallel to each other as shown in FIG. 3. In FIG. 10 there is shown a sheeting head 10' similar to head 10 of FIG. 3 and with the parts thereof designated by the same reference character with an added prime. In FIG. 10 the plenum chamber 32' is formed between broad surfaces 34' and 35', the elements of which normal to the paper of FIG. 10 are parallel but the elements of which parallel to the plane of the paper in FIG. 9 diverge at a small angle with respect to each other in a downward direction.

It will be seen, by reference to FIG. 10, that with the surfaces 34' and 35' of the plenum chamber disposed at an angle with respect to each other the conditions of flow of plastic material in distributing channel 41' have been changed from those existing in the head shown in FIG. 3. Thus in the head of FIG. 10 the lower ends 42' of the distributing channel lie further from surface 34' than they would have if surfaces 34' and 35' were parallel. Thus the construction shown in FIG. 10 encourages the flow of plastic material laterally outwardly to the sides of the plenum chamber. Not only is such construction of advantage in some instances in forming a sheet of uniform thickness, but it may also be employed to advantage in the formation of laterally extended extruded stock wherein the side edge portions are of thicker section than the intermediate or central portion of the stock.

The following example of a sheeting head made in accordance with the invention is given solely by way of illustration. With a plenum chamber having a lower edge 6 inches long, the height of the rib at $a$ (FIG. 10) may be ¼ inch whereas the height of the rib at the lower edge 40' of the plenum chamber at $b$ may be ½ inch. Although in the construction shown in FIG. 10 the surfaces 34' and 35' of the plenum chamber are not, strictly speaking, parallel, they are so nearly parallel that they may be said to be "substantially parallel," and such term as used in the claims is intended to encompass both of the constructions described above as well as other equivalent constructions.

Turning now to FIGS. 11 and 12, there is shown a third embodiment of plastic material extrusion head which may be employed to advantage in the formation of a laterally extended strip material which has a heavier or thicker section in the intermediate portion thereof than it has in the edge portions. Such strip material, designated 66, may be, for example, rubber or rubber-like tread stock for use on automobile tires. As shown, the central portion 67 of strip 66 is of uniform section, the side portions 69 of the strip tapering in thickness toward the edges thereof.

The strip 66 may be formed by an extrusion apparatus having an extrusion head such as that shown in FIG. 12. Such head not only illustrates the tipping of the two broad faces of the plenum chamber of the head with respect to each other in a direction which is the reverse of that shown in FIG. 10, but also illustrates the omission of separate die elements on the head, the exit end of the plenum chamber of the head itself acting as a die.

The head shown in FIG. 12 is generally designated by the reference character 70. Such head has a first or rear main element 71 and a second or front main element 72, said elements generally corresponding to elements 26 and 27, respectively, of the head of FIGS. 1, 2, and 3. Element 71 is connected to a delivery member 20 as before, a passage 74 in element 71 forming a prolongation of the passage in the front end of member 20 and being aligned with the mid portion 75 of a part-torodial shaped delivery distributing channel 76 similar to channel 41 in the first described embodiment. In the head of FIG. 12 the inner broad surface 77 of element 71 and the inner broad surface 79 of element 72 are disposed at a small angle with respect to each other which is the reverse of that of FIG. 10. In other words, the faces 77 and 79 diverge from each other in an upward direction as the head is shown in FIG. 12. Such disposition of faces 77 and 79 tends to close down or narrow the path of the material flowing from the two opposite outer ends of distributing channel 76, while at the same time it opens up the path of flow of plastic material from the central portion of the distributing channel. As a result, a greater volume of plastic material is delivered to the central portion of the plenum chamber than to the outer edges thereof; by proper correlation of the angle at which surfaces 77 and 79 are disposed with respect to each other with the section of the stock being extruded the required volume of plastic material will be supplied at each zone laterally across the plenum chamber to fill the plenum chamber with plastic material which moves at substantially constant speed throughout its extent at the lower delivery end of the plenum chamber.

As shown, in FIG. 12 such lower end of the plenum chamber also functions as a die. Thus the face 79 of element 72 is flat throughout its extent. The confronting face of element 71, however, is shaped so that the passage between elements 71 and 72 corresponds in section to the section of the strip 66. Thus element 71 has a central vertical broad groove therein for forming the thicker central portion 67 of the extruded material.

In FIGS. 13 and 14 there is shown a fourth embodiment of extrusion head of the invention. Such head is generally designated by the character 82. Head 82 is generally similar to the head 10 of FIGS. 1, 2 and 3; one of the differences between such heads is that the plenum chamber 84 and the forward element 85 and the rear element 88 of the head forming such chamber are in the form of a segment of a circular disc which is somewhat smaller (in angular extent) than the half-discs of the previously described embodiments. Thus the head 82, which may be formed of forward and rear main elements in the manner generally shown in FIGS. 4–9, inclusive, might, for example, be made by forming three equally angularly spaced distributing channels 86 in a blank and cutting the blank into three equal parts by radial cuts. The rear main element of the head could likewise be formed from a single blank which, after being machined to provide edge holes and a central delivery passage 87 in each portion thereof, would be cut into three equal parts. The head of FIGS. 13 and 14 has the main forward and rear elements thereof connected by studs 37' distributed around their edges. The head is provided with side pieces 44' between which there is disposed a die 49' which may have a fixed orifice or may be adjustable in generally the same manner as that of FIGS. 1, 2, and 3. Plastic material introduced into the head through delivery passage 87 is spread laterally therein by the distributing channel 86 and thence flows downwardly through the die to form an extruded strip stock material shown at 30'.

It will be seen that the extrusion head of the invention is particularly characterized from a constructional viewpoint by its simplicity and by the ease and economy with which it is made. The preferred embodiment of extrusion head is also advantageous because of the ease with which the angle which the broad faces of the plenum chamber make with each other may be readily altered in the field, as may also the contour of the distributing channel. In some instances the change in production from one plastic material to another may require an alteration in the flow characteristics of the extrusion head. The depth and arcuate length of the distributing channel may readily be increased by disassembling the sheeting head and mounting the forward element thereof on the spindle of a lathe in the proper canted position, following which the delivery channel may be altered in section or lengthened by a simple turning operation. The angle between the broad faces of the plenum chamber may be changed within appreciable limits, upon disassembly of the head, by surface grinding the ribs 36 and 39 at the required angle. Preferably the stud-receiving passages 60 in element 27 are made sufficiently large so that no alteration thereof for the proper reception of studs 37 is required upon thus altering ribs 36 and 39.

In the embodiment of FIGS. 13 and 14, however, there is shown an alternative means for spacing the main parts 85 and 90 of the head forming the plenum chamber 84.

Although plenum chamber 84 is shown as having parallel forward and rear walls, as in the first described embodiment, it is to be understood that such chamber walls may converge in either an upward direction as in FIG. 10 or in a downward direction as in FIG. 12, with appropriate changes in the shape of the spacer members, to be described. Part 88 is provided with a radially inner arcuate eat or recess 96 within which there fits a removable arcuate spacer member 97. Radially outwardly of seat 96 part 90 is provided with a second arcuate seat 99 within which there is removably positioned a second, radially outer arcuate spacer member 100.

The inner spacer member 97 has a radially inwardly projecting lip 101, the central inner portion of which forms the boundary of the central zone 93 of the distributing channel. The spacing insert 100 has an arcuate projection 102 projecting from the forward face of the spacer. Since spacers 97 and 100 are readily removable, a change in the distance between the forward and rear faces of the plenum chamber and/or the angle which such faces make with each other may be readily effected by inserting spacers of the different required contours in the seats 96 and 99. Thus an extruder need have on hand merely the main parts of the head 82 and a variety of spacers 97 and 100 of different appropriate contours to allow him to produce a wide variety of laterally extended plastic material stock having different thicknesses and contours.

The construction shown in FIGS. 13 and 14 is further of advantage because of the ease with which the plastic material-contacting surfaces of the plenum chamber may be accurately finished and polished. With the spacers 97 and 100 removed from part 88, the inner face of such part can be finished completely thereacross on a surface grinder in the same manner as the inner face of part 85. If, during use of the extrusion head, the inner face of one or both of parts 85 and 88 should become scored by the presence of unwanted hard foreign material in the plastic material in the plenum chamber, the plastic material-engaging surfaces of such parts can readily be refinished and polished, upon disassembly of the head, by simple operations including surface grinding, as above described.

As indicated, the embodiment of extrusion head shown in FIGS. 13 and 14 also differs from previously shown and described embodiments as to the shape of the distributing channel 86 in part 85. Channel 86 may be formed in part 85 in the same manner as that described for making the channels in the embodiments of FIGS. 1–12, inclusive, with the exception that the lathe tool employed has a cutting end of the same part-rhomboid section as that of the central, deepest zone 93 of the channel 86 shown in FIG. 14. Zone 93 has straight parallel horizontal upper and lower elements 105 and 106, respectively, of which element 105 is somewhat the longer. Elements 105 and 106 are joined by a straight element 107 inclined to the vertical, as shown.

As will be apparent in FIG. 14, the element 105 is tangent to the lower edge of flange 101 of the inner spacer member. The upper edge 109 of channel 86, of which element 105 is a part, lies tangent to the lower edge of flange 101 throughout the length of the channel, from one end 111 to the other thereof, as shown in FIG. 13. At ends 111 the channel 86 is of zero depth, the channel decreasing uniformly in depth from the central zone 93 to such ends 111. The lower edge 110 of channel 86, of which element 106 is a part, gradually approaches the upper edge 109 in both directions laterally away from the central zone 93.

In some instances the configuration of the part-toroidal distributing channel 86 of FIGS. 13 and 14 is to be preferred to that wherein the distributing channel is in the form of a part-torus; channel 86 is especially of advantage because its outer edge lies at the outer edge of the plenum chamber from one end of the channel to the other. The plastic material is thus forced by the distributing channel throughout the length of the latter directly against the radially outer curved boundary of the plenum chamber. Such curved boundary then immediately diverts the plastic material outwardly toward the discharge orifice or die of the extrusion head. Thus the plastic material in the plenum chamber of the embodiment of FIGS. 13 and 14 flows in optimum paths from the inlet passage 87 to each of the zones spaced laterally of the extruded product 92.

In FIG. 15 there is shown a fifth embodiment of plastic material extrusion head in accordance with the present invention. Such head, which is generally designated by the reference character 112, may be made of two main confronting plate-like elements which between them form a plenum chamber 115. The two plate-like elements are secured together by a plurality of bolts extending through them along their edges, as shown. The plenum chamber is fed with plastic material from a source of plastic material under pressure through a conduit-providing device 114 which may be similar to the device 20 in the first described embodiments. Device 114, however, is mounted upon head 112 so that the axis of member 114 is aligned with the broad mid-plane of head 112.

The plenum chamber 115 is, in effect, one lateral half of the plenum chamber in an extrusion head such as that shown in FIGS. 13 and 14. The device 114 is so disposed on the head that the upper element of the passage therethrough merges with the right-hand end of the upper boundary wall 117 of the plenum chamber. Disposed at the upper edge of the plenum chamber, and confronting the delivery device 114, is a distributing channel 116 which may be the same as one lateral half of the distributing channel 86 of FIGS. 13 and 14. Plastic material entering head 112 through the delivery device 114 is thus laterally distributed in the plenum chamber 115. After flowing along distributing channel 116, the plastic material is diverted by the boundary 117 of the plenum chamber and then flows downwardly through the chamber and outwardly through the discharge orifice 118 thereof in the form of laterally extended stock 119.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art. Thus the distributing channel, in some instances, may be disposed in the rear head element 26 (FIGS. 1-3, inclusive) in, in effect, a mirror relationship to the channel shown at 41. Such alternative construction, which is not preferred but is within the broader aspects of the present invention, delivers the plastic material from passage 31 across the plenum chamber at the upper central portion of the chamber. In such alternative construction, after impinging upon and being diverted rearwardly by the flat upper portion of wall 35 of the filled plenum chamber, the plastic material is then distributed laterally and caused to flow downwardly by the distributing channel in the front wall of the rear sheeting head element 26.

In each of the embodiments of the apparatus specifically illustrated and described herein the extrusion die or orifice of the plenum chamber has been of such contour as to form a single laterally extended extruded shape. Because of the accuracy of control of delivery of plastic material to the die or orifice of the extrusion head afforded by the apparatus of the invention, however, such apparatus advantageously lends itself to use with a die or orifice having a plurality of separate extruding passages for forming a plurality of separate extruded shapes of either the same or different sections.

I claim as new the following:

1. A plastic material extrusion head comprising an enclosure having a plenum chamber generally in the form of a part of a circular disc, said chamber having a curved edge throughout a substantial part of its peripheral angular extent and spanning a predominant part of the width of the chamber, the chamber having broad forward and rear surfaces formed by forward and rear walls of the enclosure, a passage for delivering plastic material under pressure to the chamber, said passage entering the chamber adjacent the curved edge of the chamber, a plastic material distributing channel in at least one of said surfaces of the chamber, and a broad orifice in the chamber remote from the chanel, said channel directly communicating with the inner end of the delivery passage, the channel generally paralleling the curved edge of the plenum chamber, the channel being deepest at the zone thereof nearest the inner end of the passage and progressively decreasing in depth from its zone of communication with the delivery passage, said channel distributing plastic material across the width of the chamber for forwarding such material from the chamber in a direction away from the curved edge of the chamber.

2. An extrusion head as defined in claim 1, wherein the distributing channel is generally in the form of an oblique section of a toroid.

3. An extrusion head as defined in claim 2, wherein sections of the channel transverse to its length are generally in the form of parts of a rhomboid.

4. An extrusion head as defined in claim 3, wherein the edge of the channel adjacent the curved edge of the plenum chamber is deeper than the edge of the channel remote from the curved edge of the plenum chamber.

5. An extrusion head as defined in claim 1, wherein the forward and rear faces of the plenum chamber are positioned at a small angle with respect to each other in a direction generally transverse to the orifice.

6. An extrusion head as defined in claim 1, wherein the forward and rear surfaces of the plenum chamber are positioned at a small angle with respect to each other, said surfaces diverging in a direction from the delivery passage to the orifice of the plenum chamber.

7. An extrusion head as defined in claim 1, wherein the forward and rear surfaces of the plenum chamber are positioned at a small angle with respect to each other, said surfaces diverging in a direction from the orifice of the plenum chamber to the delivery passage.

8. A plastic material extrusion head comprising an enclosure having a plenum chamber generally in the form of a segment of a circular disc, said chamber having a curved edge throughout a substantial part of its peripheral angular extent and substantially spanning the width of the chamber, the chamber having broad forward and rear surfaces formed by forward and rear walls of the enclosure, a passage for delivering plastic material under pressure to the chamber, said passage entering the chamber adjacent the mid-point of the curved edge of the chamber, and a saddle-shaped laterally symmetrical plastic material distributing channel in one of said surfaces of the chamber, said channel directly communicating at its mid-point with the inner end of the delivery passage, the channel generally paralleling the curved edge of the plenum chamber, the channel being deepest at the zone thereof nearest the inner end of the passage and progressively decreasing in depth to its ends said channel distributing plastic material across the width of the chamber for forwarding from the chamber in a direction away from the curved edge thereof.

9. An extrusion head as defined in claim 8, wherein elements of the broad forward and rear surfaces of the plenum chamber at sectioning planes parallel to the substantially straight edge of the chamber are substantially parallel.

10. An extrusion head as defined in claim 8, wherein the forward and rear walls of the enclosure are in the form of generally similar confronting, broad surfaced part-disc shaped plates, and comprising curved spacer means interposed between the plates and forming the curved edge of the plenum chamber, and means retaining the plates together in plastic material-tight relationship.

References Cited in the file of this patent
UNITED STATES PATENTS

| | | |
|---|---|---|
| 2,090,404 | Parkhurst | Aug. 17, 1937 |
| 2,479,804 | Bailey et al. | Aug. 23, 1949 |
| 2,709,834 | Johnson | June 7, 1955 |
| 2,859,475 | Tornberg | Nov. 11, 1958 |
| 2,938,231 | Lowey | May 31, 1960 |